United States Patent Office 2,705,711
Patented Apr. 5, 1955

2,705,711

9β,11β; 16α,17α-BISEPOXYPROGESTERONE

Raymond M. Dodson, Park Ridge, and Clarence G. Bergstrom, Chicago, Ill., assignors to G. D. Searle & Co., Chicago, Ill., a corporation of Illinois No Drawing. Application September 24, 1954, Serial No. 458,254

1 Claim. (Cl. 260—239.55)

The present invention relates to a new and valuable steroid and, more specifically, to 9β,11β; 16α,17α-bisepoxyprogesterone.

This compound is pharmaceutically valuable because of its hormone-like action. It produces a cortisone-like inhibitory effect on inflammatory conditions such as iritis but does not possess such other cortisone-like activities as the eosinopenic effect which limit the therapeutic applicability of the naturally occurring hormone in many patients.

The compound is also of value in the synthesis of further hormonally active compounds and cardioregulatory agents such as those described in our copending application, Serial No. 406,879, filed January 28, 1954, of which the present application is a continuation-in-part and in the application of C. G. Bergstrom, Serial No. 429,361, filed May 12, 1954. In these applications we have shown that the treatment of the compound claimed herein with a hydrohalic acid in glacial acetic acid yields the 9,16-dihalo-11β,17-dihydroxyprogesterones which can be converted in a one-step reaction by treatment with a suspension of chromic oxide in an organic amine such as pyridine, picoline, lutidine, collidine, parvoline, conyrine and the like to yield the 9α-halo-11-oxo-16α,17α-epoxyprogesterones which are valuable hypotensive agents.

The synthesis of the compounds of this application have been described in the copending applications of Dodson and Clampit, Serial No. 371,158, filed July 29, 1953 and the above-mentioned application by Dodson and Bergstrom, Serial No. 406,879, filed January 28, 1954.

The following examples will illustrate in further detail the process for preparing the compound claimed and its properties. However, it is not to be construed as limited in spirit or in scope by the details set forth therein. In these examples quantities of materials are indicated in parts by weight. The rotations are taken at 24° C.

Example 1

2500 parts of a casein digest medium are treated with 1 part of 16α,17α-epoxyprogesterone and inoculated with a culture of *Rhizopus nigricans* ATCC 62276 and shaken for four days. The reaction mixture is then extracted with hot ethyl acetate and the extract is evaporated to dryness. The residue is applied to a column containing 74 parts of silica gel. The column is washed with 900 parts of a 5% solution of ethyl acetate in benzene and then eluted with 900 parts of a 10% solution of ethyl acetate in benzene to recover unconverted 16α,17α-epoxyprogesterone. The column is next washed with 450 parts of a 20% and 220 parts of a 33% solution of ethyl acetate in benzene. Finally, the column is eluted with 220 parts of a 33% and 650 parts of a 50% solution of ethyl acetate in benzene. Concentration of these eluates yields 11α-hydroxy-16α,17α-epoxyprogesterone which, recrystallized from acetone and then from a mixture of benzene and cyclohexane, melts at about 238–238.5° C. The optical rotation of an 0.5% chloroform solution is $[\alpha]_D = +137°$. The ultraviolet absorption spectrum shows a maximum at 242 millimicrons with a molecular extinction coefficient of about 16,500.

To a solution of 100 parts of 11α-hydroxy-16α,17α-epoxyprogesterone in 200 parts of pyridine are added 151 parts of methanesulfonyl chloride. After standing for 16 hours, the product is precipitated by addition of water. After two recrystallizations from methanol, the 11α-methanesulfonyloxy - 16α,17α - epoxyprogesterone is obtained as crystals which melt at about 160–161° C. with decomposition. The optical rotation of an 0.5% chloroform solution is $[\alpha]_D = +124°$. The ultraviolet absorption spectrum shows a maximum at 238.5 millimicrons with a molecular extinction coefficient at 15,300. The infrared absorption spectrum shows maxima at 5.90, 5.98, 6.23, 7.37, 7.56, 8.52, 10.82 and 11.03 microns.

A solution of 107 parts of 11-methanesulfonyloxy-16α,17α-epoxyprogesterone and 107 parts of anhydrous sodium acetate in 1050 parts of glacial acetic acid is refluxed for 2 hours, concentrated to one-half of its original volume and then diluted with water. The crystalline precipitate is collected on a filter. The crude 16α,17α-epoxy - 4,9(11) - pregnadiene-3,20-dione thus obtained melts at about 174–179° C.

To a solution of 78 parts of this compound in 1550 parts of purified dioxane are added 105 parts of 1-N perchloric acid and 50 parts of N-bromoacetamide. After 5 minutes the unreacted N-bromoacetamide is reduced with a dilute aqueous solution of sodium sulfite. The solution is cooled in ice and water is added slowly. The product separates as an oil which crystallizes on scratching. Successive recrystallizations from a mixture of acetone and petroleum ether and then from ethyl acetate yield 9α - bromo-11β-hydroxy-16α,17α-epoxyprogesterone melting at about 152.5–153° C. with decomposition. The optical rotation of an 0.5% chloroform solution is $[\alpha]_D = +166°$. The ultraviolet absorption spectrum shows a maximum at 243 millimicrons with a molecular extinction of 15,000. The infrared absorption spectrum shows maxima at 2.88, 3.00, 5.88, and 6.08 microns.

A solution of 66 parts of 9α-bromo-11β-hydroxy-16α,17α-epoxyprogesterone and 140 parts of potassium acetate in 1600 parts of ethanol is refluxed for 1 hour and then concentrated to about 40% of its original volume. Water is added until crystals form. The precipitate is collected on a filter, dissolved in benzene and applied to a silica gel chromatography column. A 10% solution of ethyl acetate in benzene elutes the fraction containing 9β,11β; 16α,17α-bisepoxyprogesterone which, recrystallized from acetone, melts at about 228–235° C. The optical rotation of an 0.5% chloroform solution is $[\alpha]_D = +49°$. An ultraviolet maximum is observed at 244 millimicrons with a molecular extinction coefficient of 13,000. Infrared maxima are observed at 5.85, 6.00, 6.20, 7.33, and 11.57 microns. The compound has the structural formula

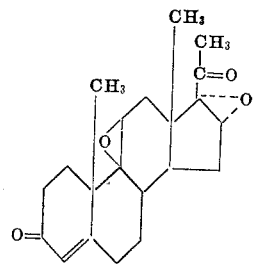

Example 2

A solution of 20.3 parts of 9β,11β; 16α,17α-bisepoxyprogesterone and 53 parts of concentrated hydrochloric acid in 525 parts of glacial acetic acid is maintained at room temperature for 3 hours and then diluted with water. An oil separates which solidifies on cooling. Recrystallized from a mixture of petroleum ether, acetone and ethyl acetate, the 9α,16β-dichloro-11β,17α-dihydroxyprogesterone melts at about 196–197° C. with decomposition. The ultraviolet absorption spectrum shows a maximum at 241 millimicrons with a molecular extinction coefficient of 17,500. The infrared spectrum shows maxima at 2.91, 5.85, 6.06, 6.20, and 7.40 microns.

What is claimed is:

9β,11β; 16α,17α-bisepoxyprogesterone.

No references cited.